(12) United States Patent
Hisao

(10) Patent No.: US 8,682,601 B2
(45) Date of Patent: Mar. 25, 2014

(54) SAFETY VALVE VIBRATION ANALYZER

(75) Inventor: Izuchi Hisao, Yokohama (JP)

(73) Assignee: Chiyoda Corporation, Yokohama-Shi (JP)

( * ) Notice: Subject to any disclaimer, the term of this patent is extended or adjusted under 35 U.S.C. 154(b) by 1093 days.

(21) Appl. No.: 12/667,497

(22) PCT Filed: Jun. 16, 2008

(86) PCT No.: PCT/JP2008/001547
§ 371 (c)(1), (2), (4) Date: Dec. 31, 2009

(87) PCT Pub. No.: WO2009/004765
PCT Pub. Date: Jan. 8, 2009

(65) Prior Publication Data
US 2010/0191485 A1 Jul. 29, 2010

(30) Foreign Application Priority Data

Jul. 3, 2007 (JP) ................. 2007-175647

(51) Int. Cl.
*G01L 7/00* (2006.01)
*G01H 17/00* (2006.01)
*G01L 27/00* (2006.01)
*G06G 7/00* (2006.01)

(52) U.S. Cl.
USPC ............ 702/56; 702/41; 702/45; 702/47; 702/183; 702/189; 73/1.57; 73/1.59; 703/9

(58) Field of Classification Search
USPC .......... 702/41, 45, 47, 56, 183, 189; 73/1.57, 73/1.59; 703/9
See application file for complete search history.

(56) References Cited

U.S. PATENT DOCUMENTS

| 4,949,288 A | 8/1990 | Bookout |
| 5,323,142 A * | 6/1994 | Fain ............................. 340/605 |
| 2010/0299122 A1 * | 11/2010 | Golinveaux et al. ............ 703/9 |

FOREIGN PATENT DOCUMENTS

| DE | 102 09 545 A1 | 10/2003 |
| EP | 0 410 317 A2 | 1/1991 |
| EP | 0 489 597 A2 | 6/1992 |
| JP | 9-4742 | 1/1997 |

OTHER PUBLICATIONS espacenet English abstract of DE 102 09 545 A1.
Harris, I, et al., "Dynamic Simulation of Safety Valve Installations", *AIChE Symposium Series*, 1984, pp. 171-178.

(Continued)

*Primary Examiner* — Sujoy Kundu
*Assistant Examiner* — L. Anderson
(74) *Attorney, Agent, or Firm* — Ladas & Parry LLP

(57) ABSTRACT

The safety valve vibration analyzer includes: a set condition input unit in which set conditions of a physical model including a safety valve and an upstream pipe connected to the safety valve are inputted; a safety valve governing equation holder that holds a safety valve governing equations; a pipe governing equation holder that holds a pipe governing equation; a processing unit that derives a time variation of a valve lift by using the set conditions inputted, the safety valve governing equations, and the pipe governing equations; and a valve lifting force function holder that holds a valve lifting force function. The processing unit derives the time variation of the valve lift by applying the valve lifting force function to the equation of motion of the valve disc.

5 Claims, 12 Drawing Sheets

(56) References Cited

OTHER PUBLICATIONS

Coppolani, P, et al., "Stability of Self Actuating Safety Valves in Liquid Service", *Trans. Int. Conf. Struct. Mech. Reactor Technology*, vol. 9-F, 1987, pp. 3-16.

Japanese Official Action Application 2007-175647 filed Sep. 21, 2011.
Himura et al., Stability of a Water Hydraulics System (Partial Translation of Marked Box); pp. 248-249 dated Mar. 29, 1997.
Patent English Abstract of Japanese 9-4742 Published Jan. 7, 1997.

* cited by examiner

200

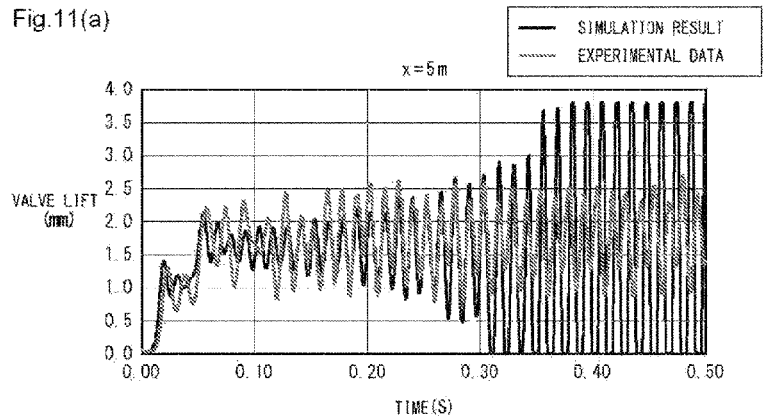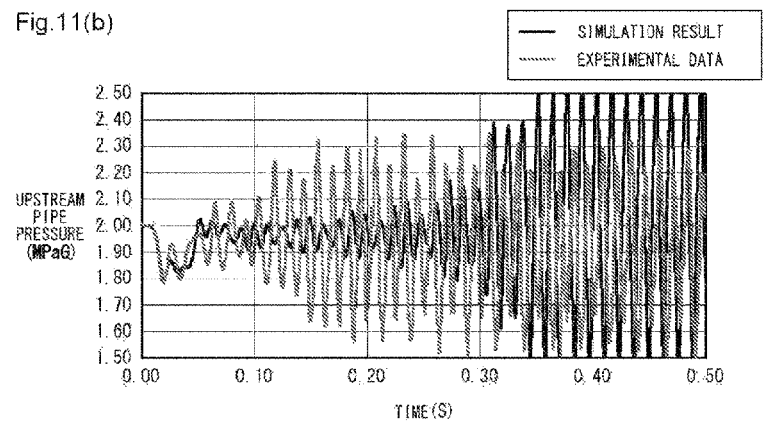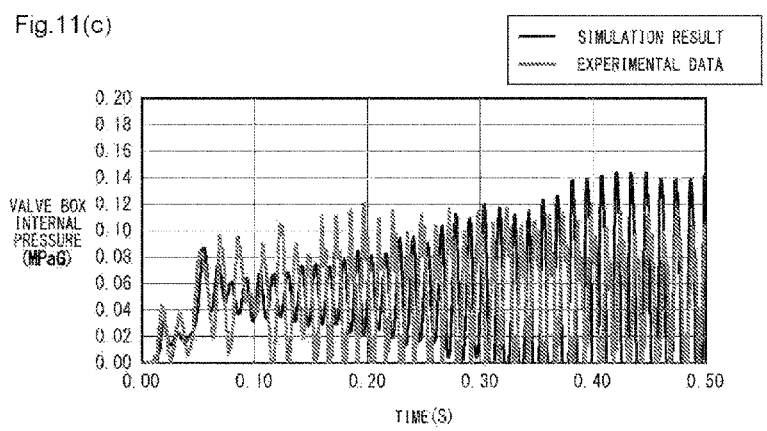

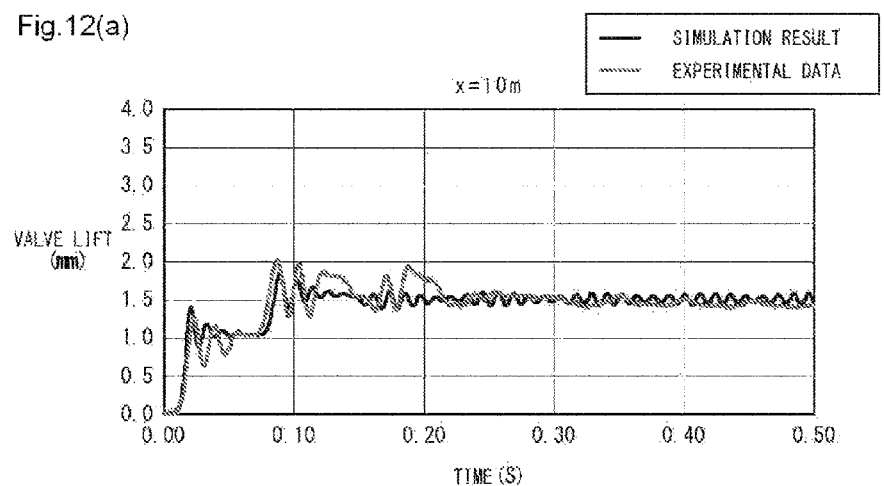
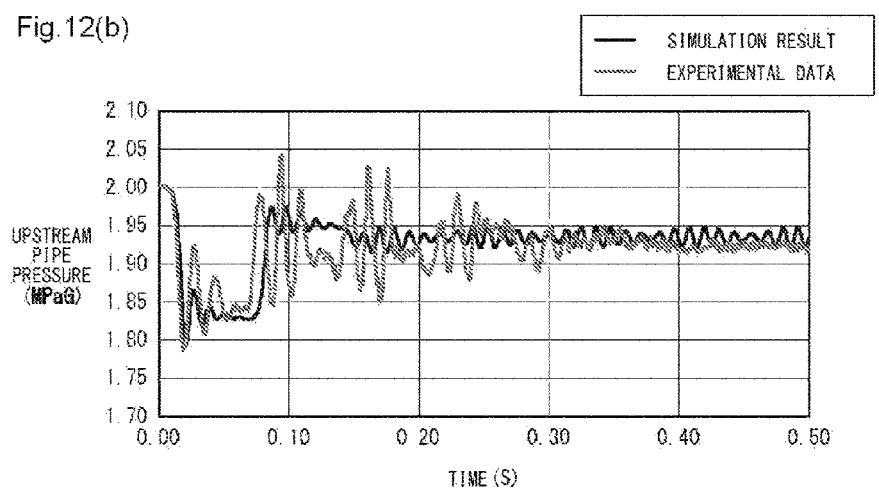
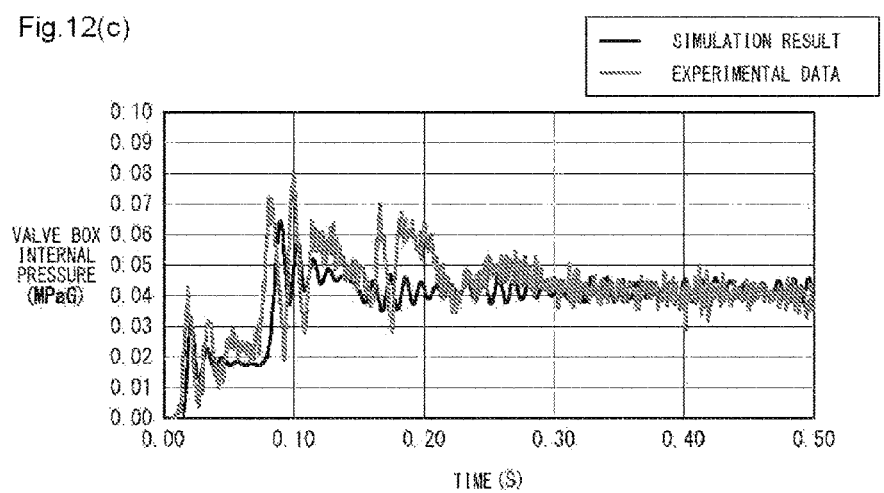

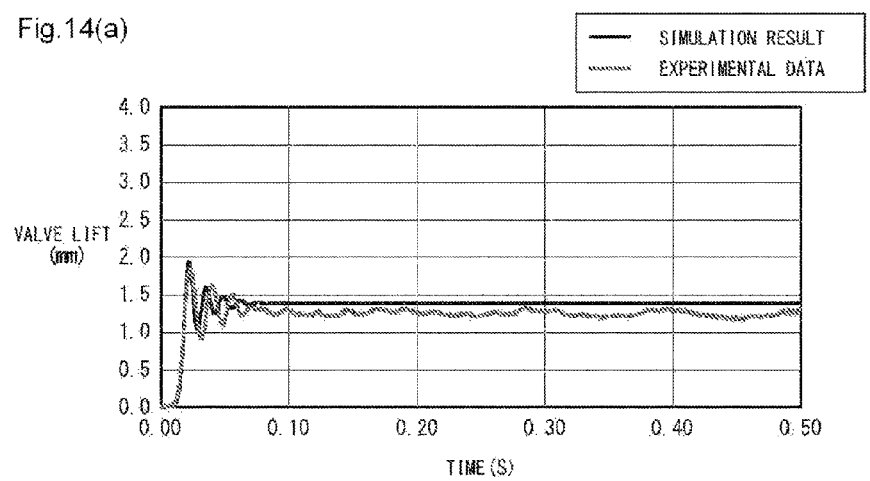
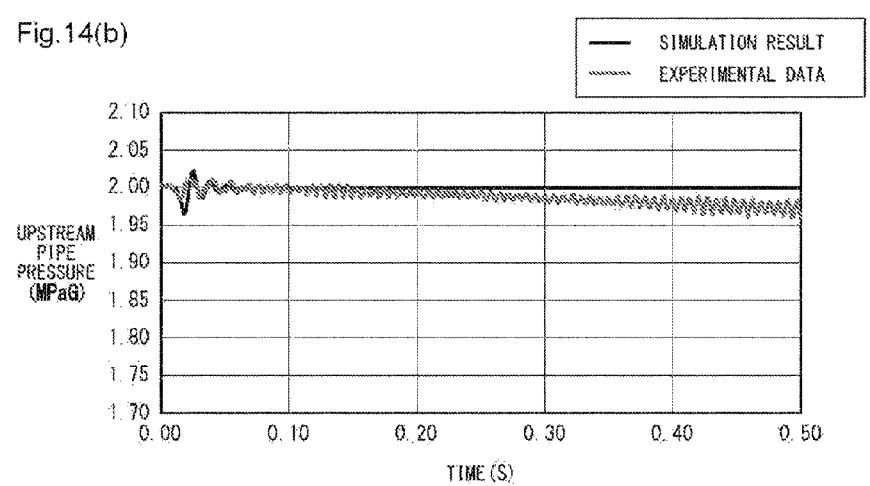
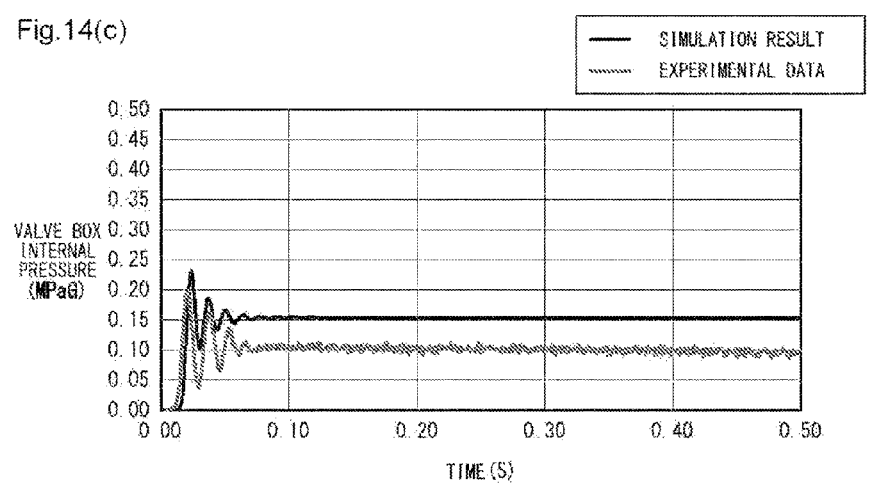

SAFETY VALVE VIBRATION ANALYZER

SAFETY VALVE VIBRATION ANALYZER

1. Field of the Invention.

The present invention relates to a safety valve vibration analyzer that analyzes vibration of a valve disc in a safety valve.

2. Description of the Related Art.

A safety valve is a safety device that operates automatically when the pressure of an internal fluid rises abnormally, and used for protecting boilers, pressure vessels and pipes or the like. A spring loaded safety valve has a structure in which a valve disc is pressed against a valve seat by the spring. When the pressure of an internal fluid exceeds a set pressure, the valve is opened with an valve lifting force exerted thereon by the pressure of the fluid, becoming larger than the spring load, thereby the internal fluid being released outside the system and an excessive pressure being prevented. On the other hand, when the pressure of the internal fluid falls, a spring loaded safety valve is closed with the spring load becoming larger than the valve lifting force. A spring loaded safety valve is extremely reliable in its operation, because it has a simple mechanism with moving part of a spring and a valve disc.

Because the valve disc is supported by the spring, a spring loaded safety valve is sometimes unstable in the relation between the spring load and the pressure of the internal fluid, causing vibration with the valve disc repeating opening and closing. Vibration of the valve disc may cause pressure pulsation in a pipe, as well as damages from hitting between the valve disc and the valve seat, leaks from the valve seat, and abrasion of the valve sliding part. Therefore, various studies have been made with respect to the vibration of a safety valve (see, for example, Non-Patent Documents 1 and 2.)

[Non Patent Citation 1] I. Harris and R. E. Lewis and T. A. Burton, "Dynamic Simulation of Safety Valve Installations", AIChE Symp. Ser., Vol. 80, and No. 236, 171-178, 1984

[Non Patent Citation 2] P. Coppolani, J. M. Henry, P. Caumette, J. L. Huet and M. Lott, and "Stability of Self Actuating Safety Valves in Liquid Service", Trans. Int. Conf. Structural Mech. Reactor Tech., Vol. 9, No. F, 3-16, 1987

Conventionally, the vibration of a safety valve has been thought to occur mainly due to an excessive pressure loss in an upstream pipe and a downstream pipe connected to the safety valve. However, the present inventor has, while analyzing the causes of vibration of an safety valve, considered whether there might be any cause other than the pressure loss, and carried out experiments to check the existence of vibration when varying the length of an upstream pipe connected to a safety valve.

As a result of the above experiments, the present inventor has learned that vibration of a safety valve occurs more easily when the length of an upstream pipe is short rather than when it is long. According to a conventional theory, vibration of a safety valve is difficult to occur when the length of an upstream pipe is short, because the pressure loss is proportional to the length of a pipe. As understood from this, a conventional technique for analyzing the vibration of a safety valve is insufficient to accurately analyze the vibration of a safety valve and a practical analysis technique is not yet to be established.

SUMMARY OF THE INVENTION.

In view of these circumstances, a general purpose of the present invention is to provide a safety valve vibration analyzer preferably capable of analyzing the vibration of a valve disc in a safety valve.

For solving the aforementioned problem, a safety valve vibration analyzer according to an embodiment of the present invention, is for analyzing the vibration of a valve disc in a safety valve, and comprises: an input unit in which a set conditions of a physical model including a safety valve and an upstream pipe connected to the safety valve is inputted; a first holder that holds a safety valve governing equations including an equation of motion of the valve disc, a flow equation at the safety valve inlet, a flow equation at the safety valve outlet, and a mass conservation equation in a valve box; a second holder that holds a pipe governing equations including a mass conservation equation, an energy equation, and an equation of motion of a fluid flowing the upstream pipe; a processing unit that derives a time variation of a valve lift by using the set conditions inputted in the input unit, the safety valve governing equations held in the first holder, and the pipe governing equations held in the second holder; and a third holder that holds a valve lifting force function representing the relation between a lift and a valve lifting force exerting on the valve disc. The processing unit reads the valve lifting force function from the third holder and derives the time variation of the valve lift by applying the valve lifting force function to the equation of motion of the valve disc.

According to this embodiment, the equation of motion of the valve disc is properly represented by applying the valve lifting force function to the equation of motion of the valve disc, allowing the vibration of a valve disc in a safety valve to be accurately analyzed.

The valve lifting force function may be created by measuring the relation between the valve lift (disk displacement from closed position) and the valve lifting force.

The processing unit may derive the time variation of the valve lift by using the equation of motion of the valve disc including the ratio of an orifice flow coefficient to an orifice critical flow coefficient of the safety valve. In this case, the equation of motion of the valve disc can be established in consideration of the change of the valve lifting force including the case where choking does not occur, based on the case where choking occurs, thereby allowing the vibration of a valve disc in a safety valve to be properly analyzed.

The equation of motion of 0the valve disc may be represented by Equation 1:

$$M_S\ddot{Z}+C_S\dot{Z}+KZ=(P_V-P_B)A_H\{1+f(Z)(\psi/\psi_C)^2\}-KZ_S$$

wherein $M_S$ represents a mass of a moving part including the valve disc; $C_S$ represents a damping coefficient; K represents a spring constant; Z represents the valve lift; $P_V$ represents a safety valve inlet pressure; $P_B$ represents a pressure in the valve box; $A_H$ represents a valve disc holder area; f(Z) represents the valve lifting force function; y represents an orifice flow coefficient; $y_C$ represents an orifice critical flow coefficient; Zs represents an initial deformation amount of a spring; and t represents time. The valve lifting force function f(Z), and the ratio of the orifice flow coefficient to the orifice critical flow coefficient, $y/y_C$, are included in the first term on the right side of the equation. The vibration of a valve disc in a safety valve can be properly analyzed by using the equation of motion of the valve disc thus represented.

An evaluation unit that determines whether the set condition inputted in the input unit is good or not in response to the operation result provided by the processing unit, may be further provided. For example, when the amplitude of the vibration of a valve disc exceeds a predetermined value, the set condition inputted may be determined to be improper.

Note that any combination of the aforementioned components or any manifestation of the present invention realized by modifications of a method, device, system, storing media, computer program, and so forth, is effective as an embodiment of the present invention.

Embodiments will now be described, by way of example only, with reference to the accompanying drawings which are meant to be exemplary, not limiting, and wherein like elements are numbered alike in the following Figures.

BRIEF DESCRIPTION OF THE DRAWINGS

FIG. 11a is a graph showing experimental data and a simulation result for valve lift plotted against time in the case where the length of the upstream pipe X is 5 m;

FIG. 11(b) is a graph showing experimental data and a simulation result for upstream pipe pressure plotted against time in the case where the length of the upstream pipe X is 5 m;

FIG. 11(c) is a graph showing experimental data and a simulation result for valve box internal pressure plotted against time in the case where the length of the upstream pipe X is 5 m;

FIG. 12a is a graph showing experimental data and a simulation result for valve lift plotted against time in the case where the length of the upstream pipe X is 10 m;

FIG. 12(b) is a graph showing experimental data and a simulation result for upstream pipe pressure plotted against time in the case where the length of the upstream pipe X is 10 m;

FIG. 12(c) is a graph showing experimental data and a simulation result for valve box internal pressure plotted against time in the case where the length of the upstream pipe X is 10 m;

FIG. 14(a) is a graph showing experimental data and a simulation result for valve lift plotted against time in the case where an area of the safety valve outlet AD is 10.0 $cm^2$;

FIG. 14(b) is a graph showing experimental data and a simulation result for upstream pipe pressure plotted against time in the case where an area of the safety valve outlet AD is 10.0 $cm^2$;

FIG. 14(c) is a graph showing experimental data and a simulation result for valve box internal pressure plotted against time in the case where an area of the safet valve outlet AD is 10.0 $cm^2$;

DETAILED DESCRIPTION OF THE INVENTION.

Hereinafter, the safety valve vibration analyzer according to the embodiment of the present invention will be described with reference to the drawings. The safety valve vibration analyzer can analyze the vibration of a valve disc in a safety valve or the pressure in a pipe or a valve box or the like, by inputting a set condition of a physical model which is set for a pipe line including a safety valve and a pipe. A user can prevent the vibration of a safety valve from happening or identify a cause of creating the vibration, by using the safety valve vibration analyzer.

Figure 1:
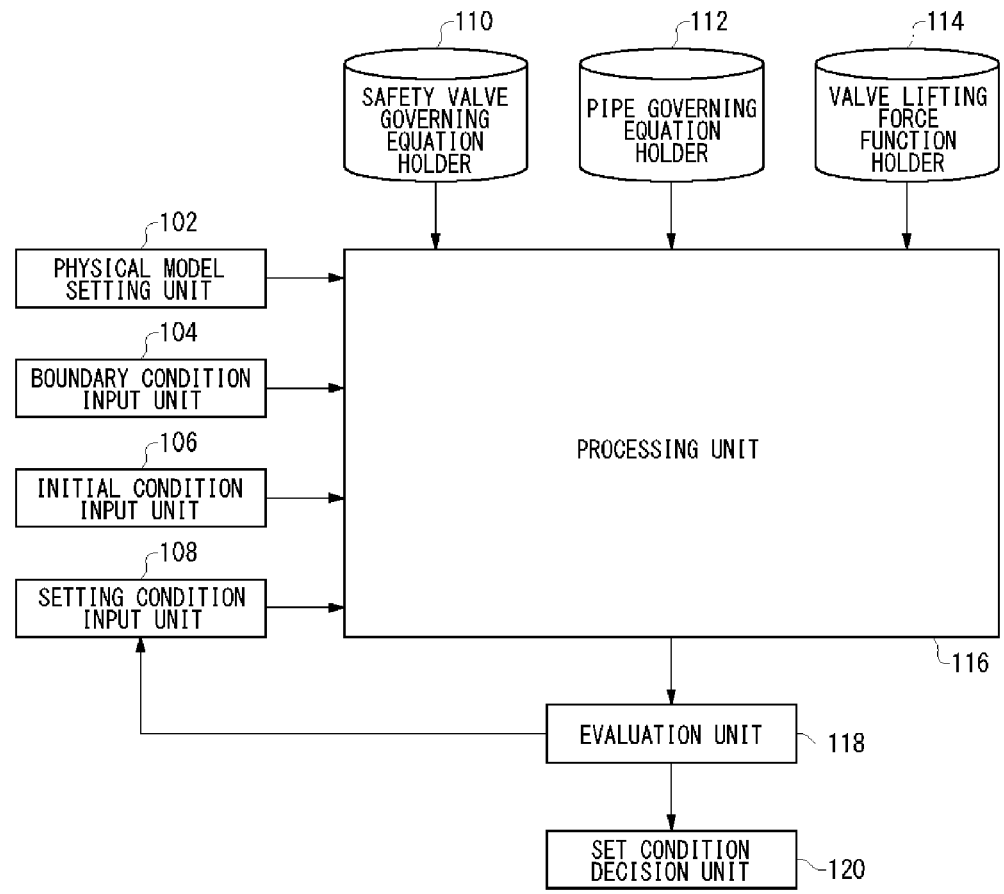
FIG. 1 is a diagram illustrating the structure of the safety valve vibration analyzer according to the embodiment of the present invention.

FIG. 1 is a diagram illustrating the structure of the safety valve vibration analyzer 100 according to the embodiment of the present invention. As illustrated in FIG. 1, the safety valve vibration analyzer 100 includes: the physical model setting unit 102, the boundary condition input unit 104, the initial condition input unit 106, the set condition input unit 108, the safety valve governing equation holder 110, the pipe governing equation holder 112, the valve lifting force function holder 114, the processing unit 116, the evaluation unit 118, and the set condition decision unit 120.

The safety valve vibration analyzer 100 is practiced by a CPU, a memory, and a program loaded on the memory, or the like, and a function block realized by the cooperation thereof is illustrated herein. The program may be built in the safety valve vibration analyzer 100, or supplied from outside in a form of being stored in a recording medium. Therefore, it would be understood by those skilled in the art that these functional blocks can be realized in a variety of forms by hardware only, software only or the combination thereof.

Figure 2:
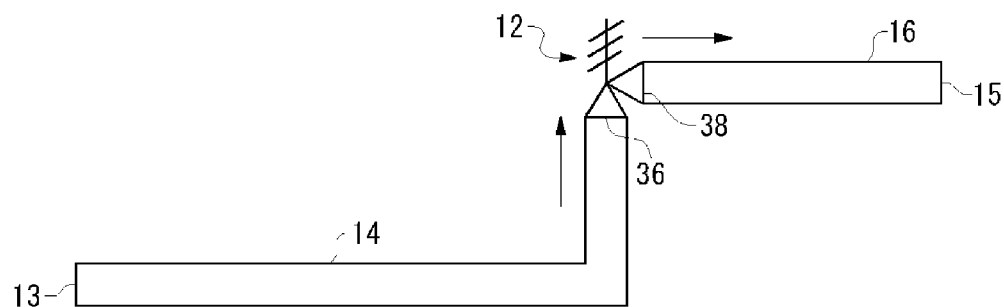
FIG. 2 is a diagram illustrating an example of a physical model of a pipe line set by an physical model setting unit.

The physical model setting unit 102 sets the physical model of a pipe line including a safety valve and a pipe connected to the safety valve. FIG. 2 is a diagram illustrating an example of a physical model of a pipe line set in the physical model setting unit 102.

The physical model 10 of the pipe line illustrated in FIG. 2 includes the safety valve 12, the upstream pipe 14 connected to the upstream side of the safety valve 12, and the downstream pipe 16 connected to the downstream side of the safety valve 12. At the end part of the opposite side to the safety valve inlet 36 of the upstream pipe 14, the upstream side pipe inlet 13 is provided, and at the end part of the opposite side to the safety outlet 38 of the downstream pipe 16, the downstream side pipe outlet 15 is provided. The upstream side pipe inlet 13 and the downstream side pipe outlet 15 have open ends, respectively. Boundary conditions at the upstream side pipe inlet 13, the downstream side pipe outlet 15, the safety valve inlet 36, and the safety valve outlet 38 are set in the boundary condition input unit 104 described later.

The present embodiment will be described assuming that an operation fluid is air; however, the operation fluid may be other types of gases without being limited to air. Air introduced from the upstream side pipe inlet 13 flows along the upstream pipe 14, the safety valve 12, and the downstream pipe 16 to be released from the downstream side pipe outlet 15.

Figure 3:
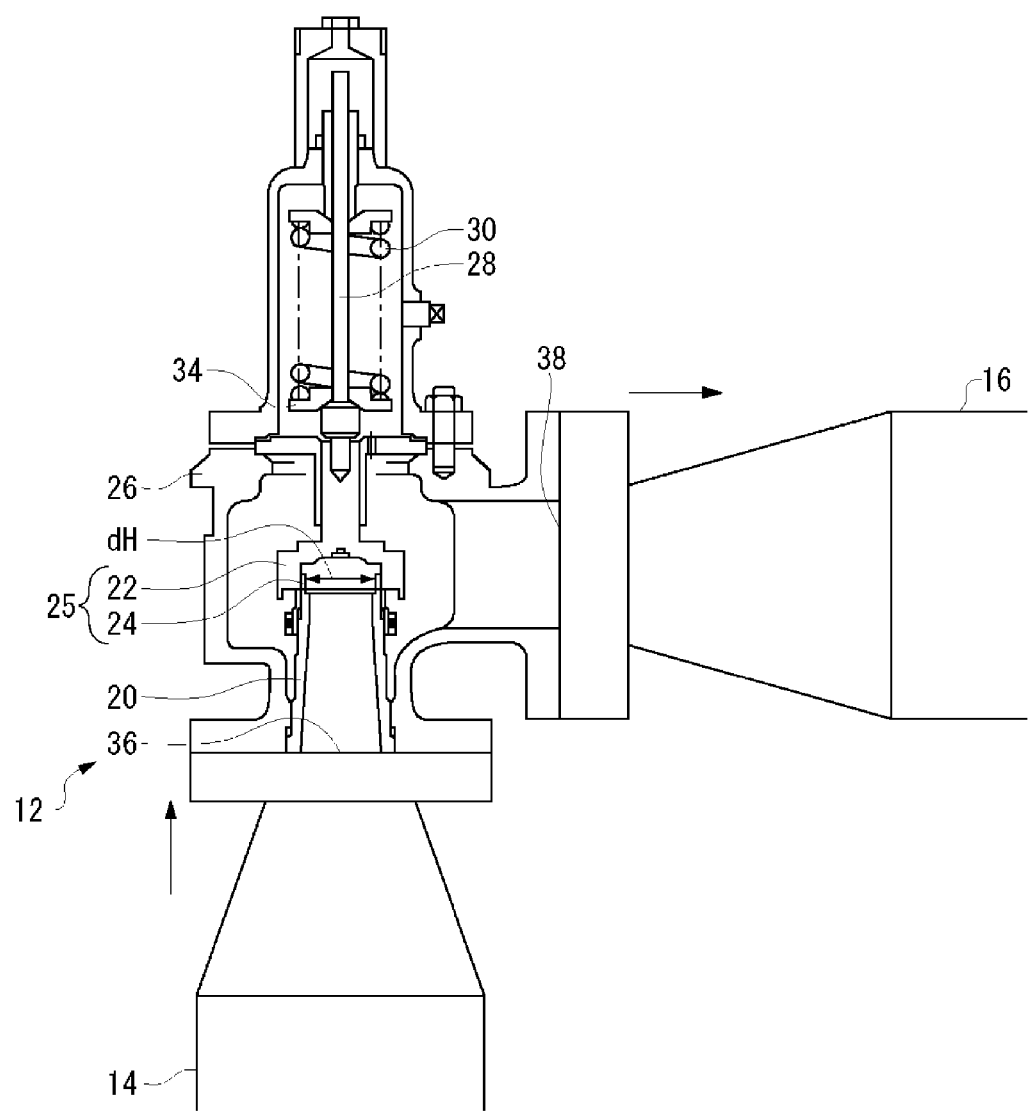
FIG. 3 is a diagram illustrating the structure of a safety valve.

FIG. 3 is a diagram illustrating the structure of the safety valve 12. The safety valve 12 illustrated in FIG. 3 has the structure in which the valve disc 25, which is made of a disc holder 22 and a disc 24, is pressed against the upper end part of the nozzle 20 by the spring 30. The nozzle 20 communicates with the upstream pipe 14, and the valve disc 25 is, when the pressure of the upstream pipe 14 rises to exceed a predetermined set pressure, displaced upward against the spring power of the spring 30, thereby air flowing into the valve box 26. Air introduced into the valve box 26 flows into the downstream pipe 16 through the safety valve outlet 38.

Boundary conditions at the upstream side pipe inlet 13, the downstream side pipe outlet 15, the safety valve inlet 36, and the safety valve outlet 38, are inputted in the boundary condition input unit 104. In the present embodiment, boundary conditions are set as follows: at the safety valve inlet 36, it is assumed that a rate of the outflow W of the upstream pipe 14 and a rate of the inflow Ws of the safety valve 12 are equal, that is, $W=W_S$. At the safety valve outlet 38, it is assumed that a rate of the outflow $W_D$ of the safety valve 12 and a rate of the inflow W of the downstream pipe 16 are equal, that is, $W=W_D$. At the upstream side pipe inlet 13, the pressure P in the upstream pipe 14 is set to be constant on the assumption that a pressure vessel with large capacity is connected. At the downstream side pipe outlet 15, the pressure P in the downstream pipe 16 is set to be constant on the assumption that a header with a large diameter is connected.

Set conditions of a physical model of a pipe line including the safety valve 12, the upstream pipe 14, and the downstream pipe 16, are inputted in the set condition input unit 108. As the set conditions, parameters used for vibration analysis, i.e., the shape of a safety valve, the size of a pipe line, or the like, are inputted. A set condition refers to a parameter necessary for the analysis of a physical model, and specifically, to a parameter required for the governing equation of a safety valve or a pipe described later.

An initial condition of a predetermined parameter at the time t=0, is inputted in the initial condition input unit 106. For example, initial conditions, such as a valve lift and a speed of the valve disc at the time t=0, are inputted in the initial condition input unit 106.

The safety valve governing equation holder 110 holds a safety valve governing equations including an equation of motion of the valve disc, a flow equation at the inlet of the safety valve, a flow equation at the outlet of the safety valve, and a mass conservation equation in the valve box. Each equation will be shown below.

The equation of motion of a valve disc is represented by the following equation (1):

$$M_S\ddot{Z}+C_S\dot{Z}+KZ=(P_V-P_B)A_H\{1+f(Z)(\psi/\psi_C)^2\}-KZ_S \quad (1)$$

wherein $M_S$ represents a mass of a moving part (kg); $C_S$ represents a damping coefficient (N·s/m); K represents a spring constant (N/m); Z represents a Valve lift (n); $P_V$ represents a safety valve inlet pressure (Pa); $P_B$ represents a pressure in the valve box (Pa); $A_H$ represents a valve disc holder area (m²); f(Z) represents a valve lifting force function; y represents an orifice flow coefficient; $y_C$ represents an orifice critical flow coefficient; $Z_S$ represents an initial spring deformation amount (m); and t represents time (s). The mass of the moving part Ms is the sum of the disc holder 22, the disc 24, the spindle 28, the lower spring seat 34, and the spring 30 (for the spring 30 ⅓ of the spring total mass is effective to the mass of the moving part).

The first term on the right side of Equation (1) represents a valve lifting force F exerting on the valve disc 25. As shown in Equation (1), in the safety valve vibration analyzer 100 according to, the present embodiment, the valve lifting force F includes: the difference $(P_V-P_B)$ of the safety valve inlet pressure $P_V$ and the valve box internal pressure $P_B$ multiplied by the valve disc holder area $A_H$; and further the valve lifting force function f(Z) multiplied by the square of the ratio $y/y_C$ of the orifice flow coefficient y to the orifice critical flow coefficient $y_C$ of the safety valve (hereinafter, referred to as the flow coefficient ratio.) The valve lifting force F can be properly represented by including this term.

The valve lifting force function f(Z) is a function indicating the relation between the valve lift and the valve lifting force exerting on the valve disc, and is defined by the structure of a safety valve. The valve lifting force function f(Z) is held in the valve lifting force function holder 114 described later, and is created by actual measurement of the relation between the valve lift and the valve lifting force. By applying the valve lifting force function f(Z) to the equation of motion of the valve disc, the valve lifting force F exerting on the valve disc can be properly represented, allowing a proper vibration analysis to be made.

The Orifice flow coefficient y varies in accordance with the relation between the critical pressure $P_C$, which is defined by the following Equation (2), and the safety valve inlet pressure $P_V$.

$$P_c = P_V\left(\frac{2}{\kappa+1}\right)^{\frac{\kappa}{\kappa-1}} \quad (2)$$

When the valve box internal pressure $P_B$ is equal to or less than the critical pressure $P_C$ ($P_B \leq P_C$), the orifice flow coefficient y is represented by the following Equation (3). The coefficient is a constant and the orifice flow coefficient y in this case is the orifice critical flow coefficient $y_C$.

$$\psi = \psi_c = \sqrt{\kappa\left(\frac{2}{\kappa+1}\right)^{\frac{\kappa+1}{\kappa-1}}} \qquad (3)$$

On the other hand, when the valve box internal pressure $P_B$ is more than the critical pressure $P_C$ ($P_B > P_C$), the orifice flow coefficient y is represented by the following Equation (4). As shown in Equation (4), the coefficient is a function of the pressure ratio $P_B/P_V$ of the valve box internal pressure $P_B$ to the safety valve inlet pressure $P_V$.

$$\psi = \sqrt{\frac{2\kappa}{\kappa-1}\left[\left(\frac{P_B}{P_V}\right)^{\frac{2}{\kappa}} - \left(\frac{P_B}{P_V}\right)^{\frac{\kappa+1}{\kappa}}\right]} \qquad (4)$$

In the present embodiment, the equation of motion of the valve disc is established with the influence of choking occurring when air flows into the valve box 26 from the nozzle 20, being considered, by applying the flow coefficient ratio $y/y_C$, which is calculated by using Equations (3)-(4), to the equation of motion of the valve disc. For example, when the valve box internal pressure $P_B$ is less than the critical pressure $P_C$ and is in the choking condition, the flow coefficient ratio $y/y_C$ is 1, therefore the valve lifting force F is what $A_H(P_V - P_B)$ is multiplied by 1+f(Z). On the other hand, when the valve box internal pressure $P_B$ is more than the critical pressure $P_C$, the flow coefficient ratio $y/y_C$ is less than 1, therefore the valve lifting force F is less than what is in the choking condition. Thus, by applying the flow coefficient ratio $y/y_C$ to the equation of motion of the valve disc, variation in the valve lifting force F by choking is taken into consideration, allowing a proper vibration analysis to be made. It is noted that the flow coefficient ratio is squared for representing it as a kinetic energy in Equation (1).

A flow rate equation at the safety valve inlet 36 is represented by the following Equation (5):

$$W_S = \frac{A_S C_d \psi P_V}{\sqrt{zRT_0/M_w}} \qquad (5)$$

wherein $W_S$ represents a rate of the inflow (kg/s); $A_S$ represents an effective orifice area (m$^2$); $C_d$ represents a nozzle flow coefficient; z represents a gas compressibility factor; $M_W$ represents a gas average molecular weight (kg/kmol); R represents the gas constant (8314 J·kg/kmol/K); and $T_0$ represents a total temperature (K).

The effective orifice area $A_S$ in Equation (5) is represented by the following Equation (6):

$$A_S = \min(\pi d_H Z, A_O) \qquad (6)$$

wherein $d_H$ represents a disc holder diameter (m); and $A_O$ represents a nozzle orifice area (m$^2$).

A flow rate equation at the safety valve outlet 38 is represented by the following Equation (7):

$$W_D = \frac{A_D C_{dD} \psi P_B}{\sqrt{zRT_0/M_w}} \qquad (7)$$

wherein $W_D$ represents a rate of the outflow (kg/s); $A_D$ represents the safety valve outlet area (m$^2$); and $C_{dD}$ represents an outlet area flow coefficient. The orifice flow coefficient y in Equation (7) is used by replacing the valve box internal pressure $P_B$ and the safety valve inlet pressure $P_V$ in Equation (4) with the safety valve downstream pressure $P_D$ and the valve box internal pressure $P_B$, respectively.

The mass conservation equation in the valve box is represented by the following Equation (8); Equation (9) represents a gas density $r_B$(kg/m$^3$) in the valve box; and Equation (10) represents an equation of state in the valve box:

$$\frac{dM_B}{dt} = W_s - W_D, \qquad (8)$$

$$\rho_B = \frac{M_B}{V_B}, \qquad (9)$$

$$P_B = \frac{\rho_B z R T_B}{M_w} \qquad (10)$$

wherein $M_B$ represents a gas mass in the valve box (kg); $T_B$ represents a gas temperature in the valve box (K); and $V_B$ represents the a valve box capacity (m$^3$).

Figure 4:
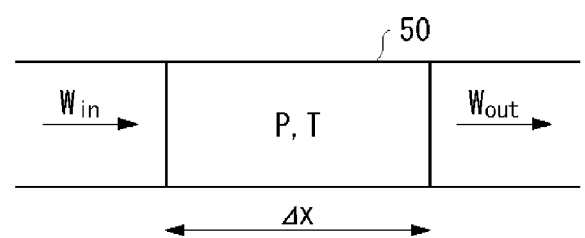
FIG. 4 is a diagram illustrating a mass conservation equation and an energy equation of a fluid in the pipe.

The pipe governing equation holder 112 holds a pipe governing equations including a mass conservation equation, an energy equation, and an equation of motion of a fluid flowing the pipe, such as the upstream pipe 14 and the downstream pipe 16. FIG. 4 is a diagram illustrating the mass conservation equation and the energy equation of a fluid in the pipe. A pipe is divided into pipe elements of which each element has its length of the divided length $D_X$(m) as shown in FIG. 4, and the governing equation is applied to each pipe element. Each equation will be shown below.

The mass conservation equation in one pipe element 50 shown in FIG. 4, is represented by the following Equation (11). Equation (12) represents the gas density r in the pipe element 50, and Equation (13) represents the equation of state in the pipe element 50:

$$\frac{dM}{dt} = W_{in} - W_{out} \qquad (11)$$

$$\rho = \frac{M}{A\Delta x} \qquad (12)$$

$$P = \frac{\rho z R T}{M_w} \qquad (13)$$

wherein M represents a gas mass (kg) in the pipe element 50; $W_{in}$ represents a rate of the inflow (kg/s) into the pipe element 50; $W_{out}$ represents a rate of the outflow (kg/s) from the pipe element 50; r represents a gas density (kg/m$^3$) in the pipe element 50; A represents the flow area of the pipe (m$^2$); P represents a gas pressure (Pa) in the pipe element 50; and T represents a gas temperature (K) in pipe element 50.

The energy equation in the pipe element 50 is represented by the following Equation (14):

$$T + \frac{U^2}{2C_P} = T_0 = const. \qquad (14)$$

wherein U represents a gas velocity (m/s) in the pipe element 50; $C_P$ represents the gas specific heat under constant pressure (J/kg/K). Equation (14) means that the higher the gas velocity U, the lower the gas temperature T.

Figure 5:
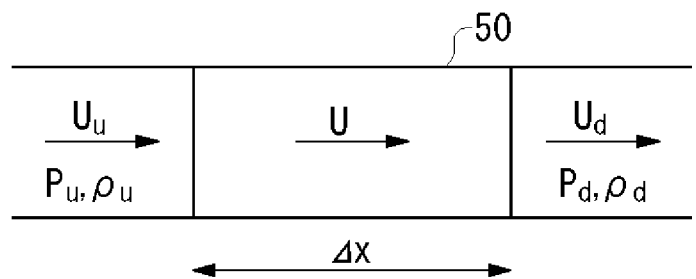
FIG. 5 is a diagram illustrating an equation of motion of a fluid in the pipe.

FIG. 5 is a diagram illustrating the equation of motion of a fluid in the pipe. In FIG. 5, $U_U$ represents a gas velocity on the side of the upstream of the pipe element 50 having its length of $D_x$, Pu represents a gas pressure on the same side, and $r_U$ represents a gas density on the same side. $U_d$ represents a gas velocity on the side of the downstream of the pipe element 50, $P_U$ represents a gas pressure on the same side, and $r_d$ represents a gas density on the same side.

The equation of motion of a fluid in the pipe element 50 is generally represented by the following Equation (15):

$$\rho\left(\frac{\partial U}{\partial t} + U\frac{\partial U}{\partial x}\right) = -\frac{\partial P}{\partial x} - f\frac{1}{D}\cdot\frac{\rho U|U|}{2} \quad (15)$$

wherein f represents a friction factor of a pipe, and D represents the inner diameter of a pipe.

Equation (16) representing the change rate of the gas flow rate can be obtained by deforming Equation (15). F1 in Equation (16) is represented by Equation (17); F2 by Equation (18) or Equation (19); and F3 by Equation (20).

$$\frac{dU}{dt} = F1 + F2 + F3 \quad (16)$$

$$F1 = -\frac{1}{\rho}\frac{\partial P}{\partial x} = -\frac{P_d - P_u}{\rho\Delta x} \quad (17)$$

$$F2 = -U\frac{\partial U}{\partial x} = -U_u\frac{U - U_u}{\Delta x} \quad (18)$$

$$F2 = -U\frac{U_d - U}{\Delta x} \quad (19)$$

$$F3 = -f\frac{1}{D}\cdot\frac{U|U|}{2} \quad (20)$$

In Equations (16) to (20), F1 represents a pressure term; F2 represents an inertia term; and F3 represents a friction loss term. Equation (18) represents the inertia term when a fluid flows from the upstream side to the downstream side; and equation (19) represents the inertia term when a fluid flows from the downstream side to the upstream side.

The valve lifting force function holder 114 holds the valve lifting force function f(Z) representing the relation between the valve lift and the valve lifting force exerting on the valve disc. As described above, the valve lifting force function is a function created by actual measurement of the relation between the valve lift and the valve lifting force, and is defined by the structure of the safety valve.

Figure 6:
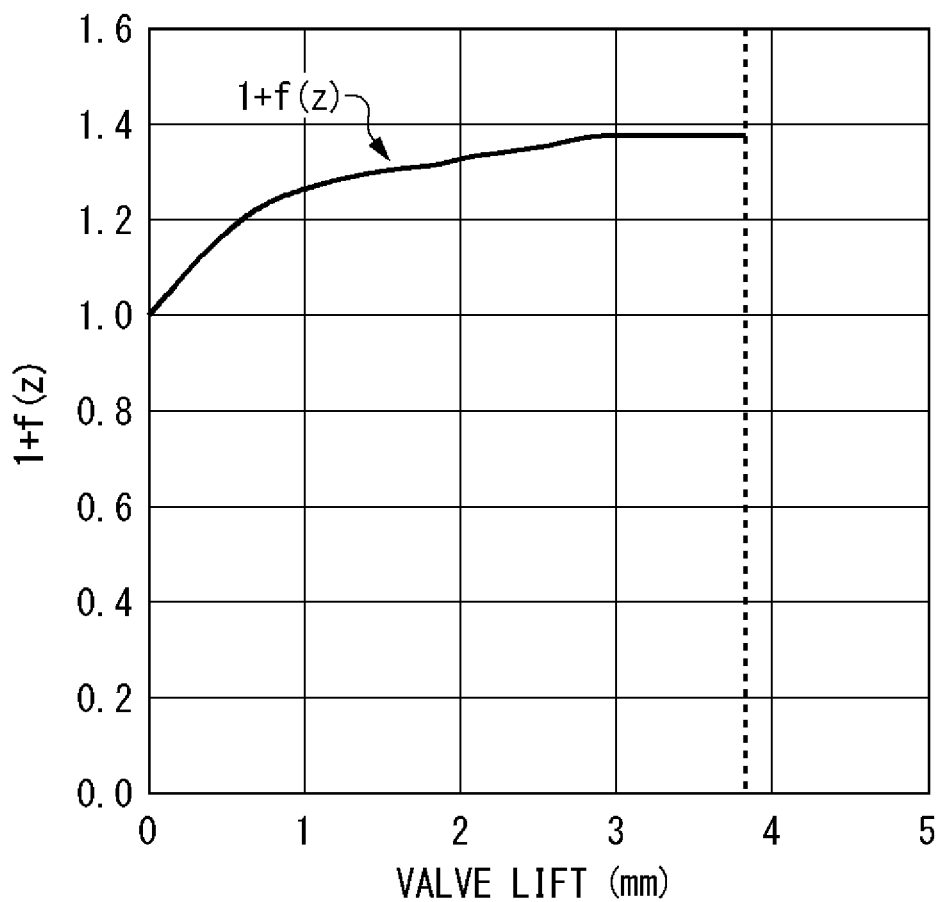
FIG. 6 is a graph illustrating an example of the valve lifting force function.

FIG. 6 is a graph illustrating an example of the valve lifting force function. The horizontal axis of FIG. 6 represents the valve lift (mm), and the vertical axis represents 1+f(Z). The valve lifting force function holder 114 holds a valve lifting force function as illustrated in FIG. 6. The valve lifting force function holder 114 may hold a plurality of valve lifting force functions in accordance with the types of the safety valves.

When creating the valve lifting force function f(Z), a valve lifting force is measured for every valve lift by using a load cell, after removing the spring of the safety valve and adjusting the valve lift with the use of a jig. The valve lifting force function f(Z) is calculated from the valve lifting forces measured and the pressures in the safety valve inlet and the valve box.

The processing unit 116 carries out a vibration analysis of the safety valve using: the physical model set in the physical model setting unit 102; the boundary conditions inputted in the boundary condition input unit 104; the initial conditions inputted in the initial condition input unit 106; the set conditions inputted in the set condition input unit 108; the safety valve governing equations held in the safety valve governing equation holder 110; and the pipe governing equations held in the pipe governing equation holder 112. Herein, the time variations of the valve lift Z, the upstream pipe pressure $P_V$, and the valve box internal pressure $P_B$, are derived as the vibration analysis of a safety valve. When calculating, the processing unit 116 appropriately reads the valve lifting force function from the valve lifting force function holder 114, and derives the time variations of the valve lift Z, the upstream pipe pressure $P_V$, and the valve box internal pressure $P_B$, by applying the valve lifting force function f(Z) to the equation of motion of the valve disc.

Specifically, numerical integration of differential equations of: the equation of motion of the valve disc of Equation (1); the mass conservation equation in the valve box of Equation (8); the mass conservation equation of the fluid flowing in the pipe of Equation (11); and the equation of motion of the fluid of Equation (16), by the RungeKutta method, are carried out with the use of the relations of Equations (2) to (7), Equation (9), Equation (10), Equations (12)-(14), and Equations (17)-(20). The time variation of the valve lift Z is found by integrating the equation of motion of the valve disc of Equation (1); and the time variation of the upstream pipe pressure $P_V$ and the valve box internal pressure $P_B$ are found as a result of integration of the mass conservation equation in a valve box of Equation (8), the mass conservation equation of the fluid of Equation (11), and the equation of motion of the fluid of Equation (16). For the numerical integration, the Euler method also can be applied.

The evaluation unit 118 determines whether the set conditions inputted in the set condition input unit 108 is good or not in response to the operation result provided by the processing unit 116. For example, when vibration occurs by an set condition inputted, the inputted set conditions are determined to be improper. The occurrence of vibration is determined, for example, based on the judgment of whether the amplitude of the vibration exceeds a predetermined value. At the time, the evaluation unit 118 may give a command to the set condition input unit 108 that new set conditions should be inputted. The command may be automatically given to the vibration analysis program, or may be shown to a user inputting set conditions through a monitor or a sound.

The set condition decision unit 120 decides that set conditions are proper when the set conditions are determined to be proper from the evaluation result made by evaluation unit 118.

Figure 7:
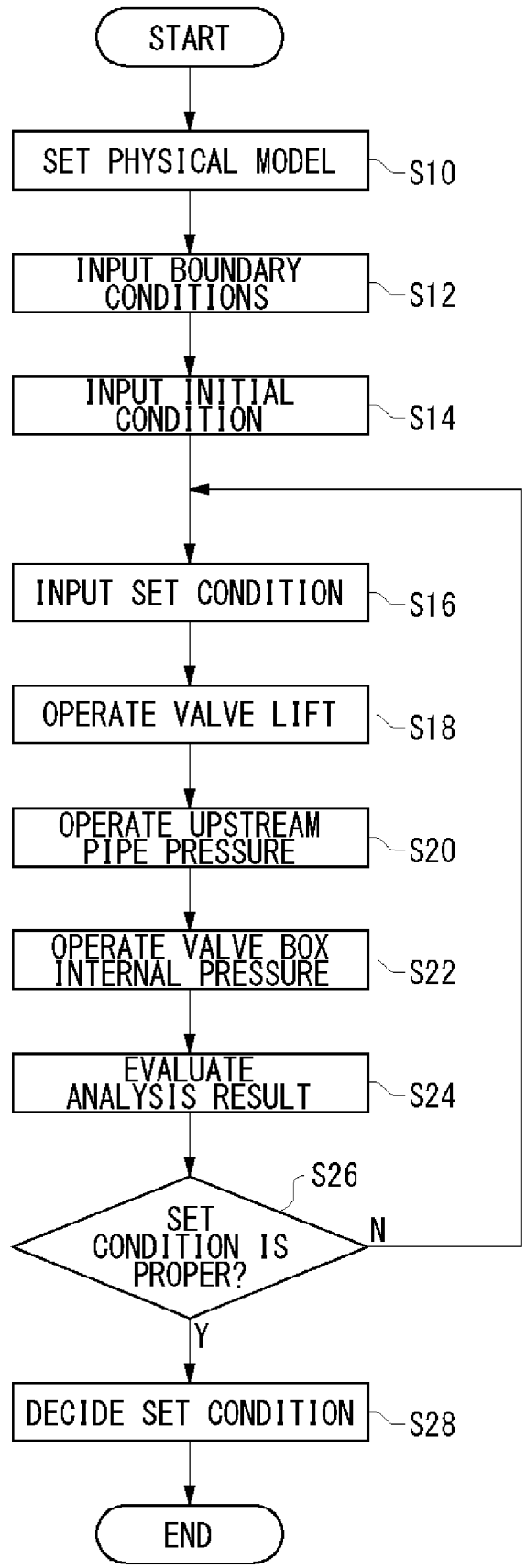
FIG. 7 is a flow chart illustrating the process flow of the safety valve vibration analyzer according to the embodiment.

FIG. 7 is a flow chart illustrating the process flow of the safety valve vibration analyzer according to the embodiment. A user at first sets a physical model of a pipe including the safety valve 12, the upstream pipe 14, and the downstream pipe 16 in the physical model setting unit 102 (S10).

Next, the user inputs boundary conditions at the upstream side pipe inlet 13, the downstream side pipe outlet 15, the safety valve inlet 36, and the safety valve outlet 38 in the boundary condition input unit 104 (S12). The user then inputs initial conditions in the initial condition input unit 106 (S14). The user then inputs set conditions of the set physical model in the set condition input unit 108 (S16).

After completing the above input operations, the processing unit 116 operates time variations of the valve lift Z, the upstream pipe pressure $P_V$, and the valve box internal pressure $P_B$, using a physical model set in the physical model setting unit 102, boundary conditions inputted in the boundary condition input unit 104, initial conditions inputted in the initial condition input unit 106, set conditions inputted in the set condition input unit 108, the safety valve governing equations held in the safety valve governing equation holder 110, the pipe governing equations held in the pipe governing equation holder 112 (S18-S22). When operating, the processing unit 116 appropriately reads the valve lifting force function f(Z) from the valve lifting force function holder 114, and operates by applying the valve lifting force function f(Z) to the equation of motion of the valve disc.

After completing the operation, the evaluation unit 118 determines whether the set conditions inputted in the set condition input unit 108 are proper or not, in response to the analysis result by processing unit 116 (S24). When the set conditions are not proper, the evaluation unit 118 gives a command to the set condition input unit 108 that new set conditions should be inputted (N of S26). When the set conditions are proper (Y of S26), the set condition decision unit 120 decides that the set conditions are proper (S28). With the above steps, the process flow of the safety valve vibration analyzer 100 ends.

A comparison between a simulation result and experimental data obtained by using the safety valve vibration analyzer 100 according to the present embodiment, will be shown below.

Figure 8:
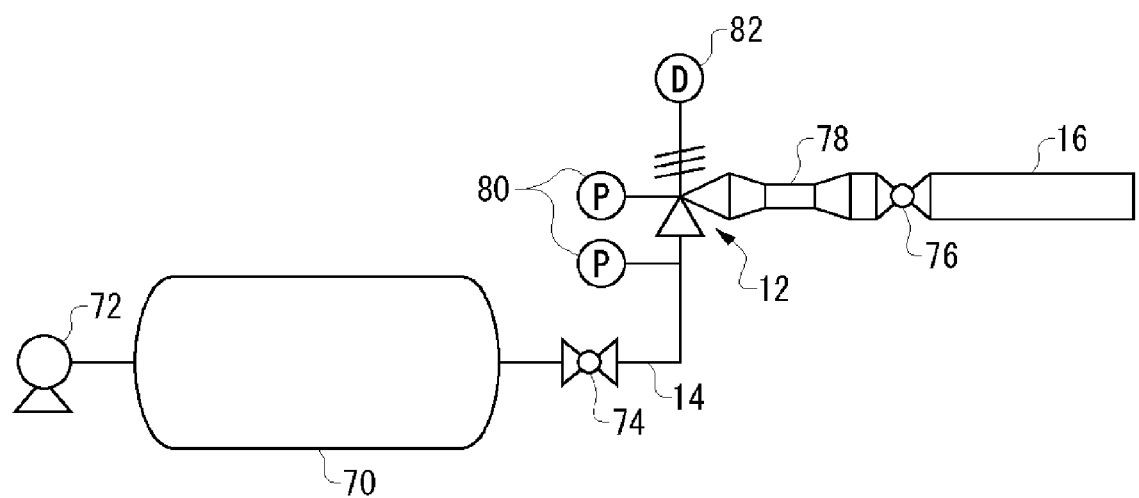
FIG. 8 is a diagram illustrating an experiment system for measuring the vibration of a safety valve.

FIG. 8 is a diagram illustrating an experiment system for measuring the vibration of the safety valve 200. The experiment system 200 includes: the safety valve 12; the upstream pipe 14 connected to the upstream side of the safety valve 12; the container 70 connected to the upstream pipe 14 via the ball valve 74; the compressor 72 for maintaining the pressure of the container 70 to be constant (20 barG); the reducing part 78 on the downstream side of the safety valve 12; and the downstream pipe 16 connected to the safety valve via the ball valve 76. The laser displacement transmitter 82 for measuring the displacement of the valve disc was provided to the safety valve 12, and the pressure sensors 80 for measuring the pressure were provided to the upstream pipe 14 and the safety valve 12, respectively. Vibration experiments of the safety valve were conducted with the use of the experiment system 200 about the case where the length x of the upstream pipe 14 was varied and the case where the safety valve outlet area $A_D$ was varied.

A vibration simulation of the safety valve was conducted after set conditions, which were set to the physical model structured likewise to the experiment system 200, were inputted in the safety valve vibration analyzer 100 according to the present embodiment.

Figure 9A:
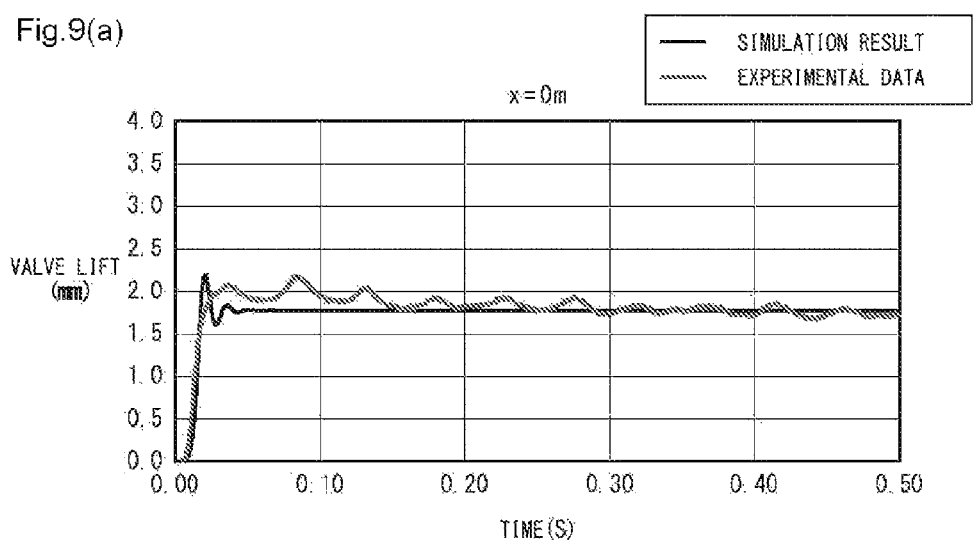
FIG. 9a is a graph showing experimental data and a simulation result for valve lift plotted against time in the case where the length of the upstream pipe X is 0 m.
Figure 9B:
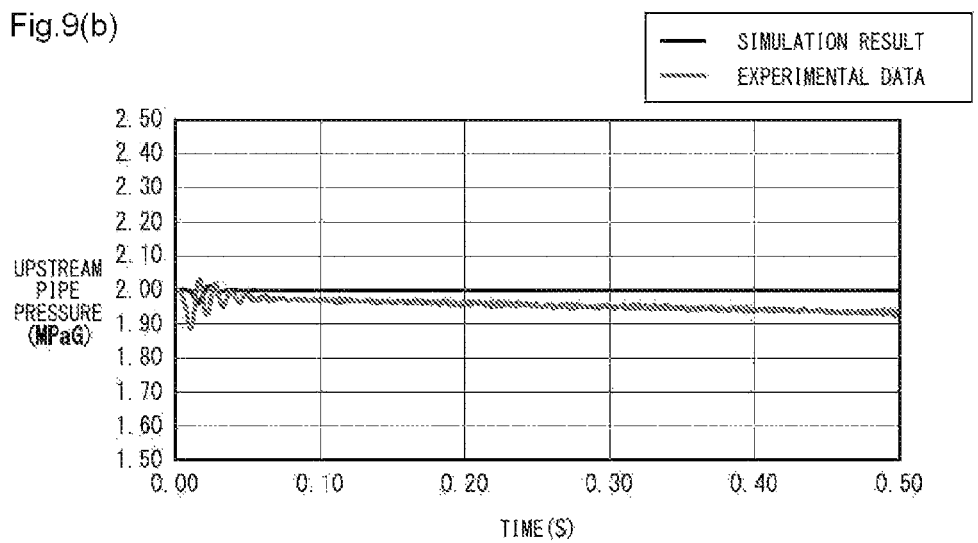
FIG. 9(b) is a graph showing experimental data and a simulation result for upstream pipe pressure plotted against time in the case where the length of the upstream pipe X is 0 m.
Figure 9C:
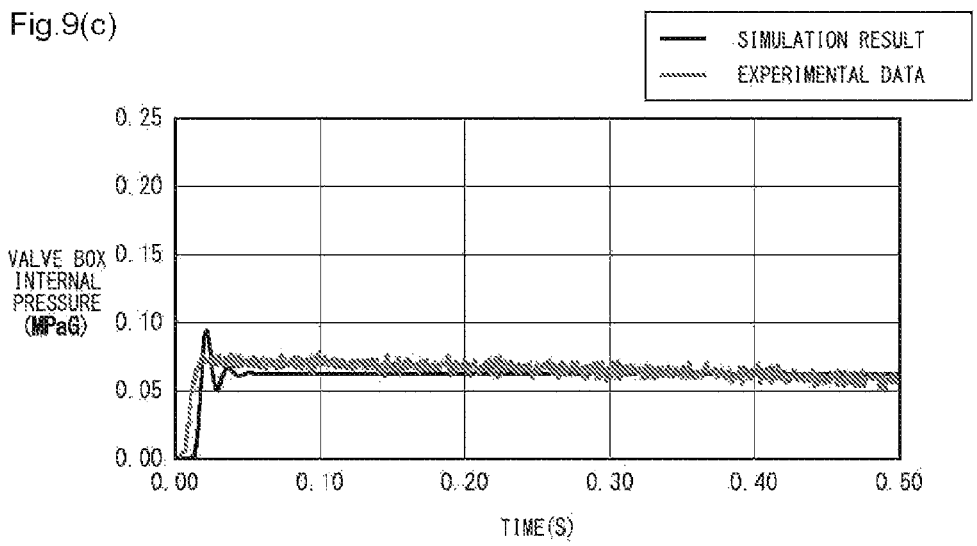
FIG. 9(c) is a graph showing experimental data and a simulation result for valve box internal pressure plotted against time in the case where the length of the upstream pipe X is 0 m.
Figure 10A:
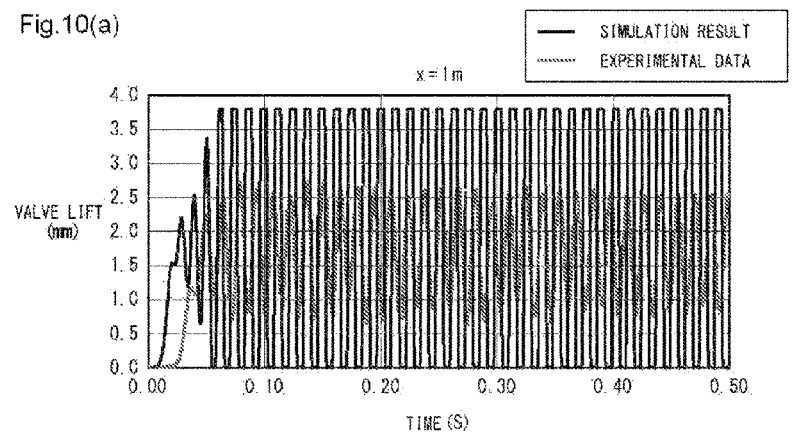
FIG. 10a is a graph showing experimental data and a simulation result for valve lift plotted against time in the case where the length of the upstream pipe X is 1 m.
Figure 10B:
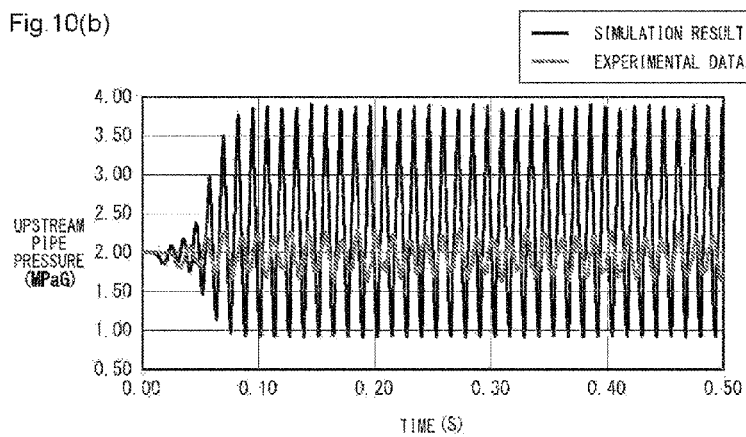
Fig 10(b) is a graph showing experimental data and a simulation result for upstream pipe pressure plotted against time in the case where the length of the upstream pipe X is 1 m.
Figure 10C:
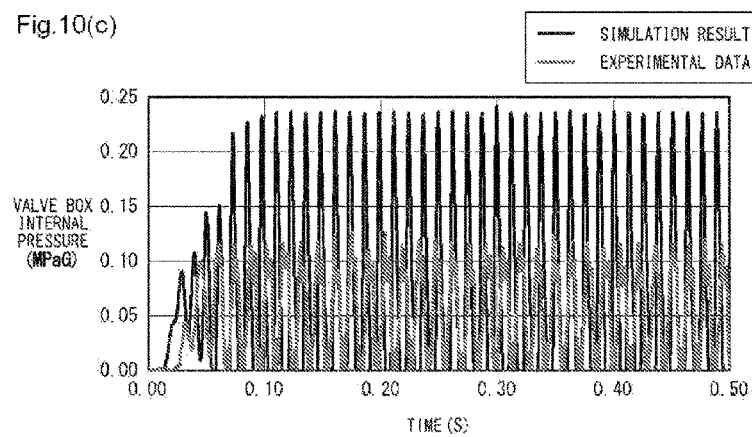
FIG. 10(c) is a graph showing experimental data and a simulation result for valve box internal pressure plotted against time in the case where the length of the upstream pipe X is 1 m.
Figure 13A:
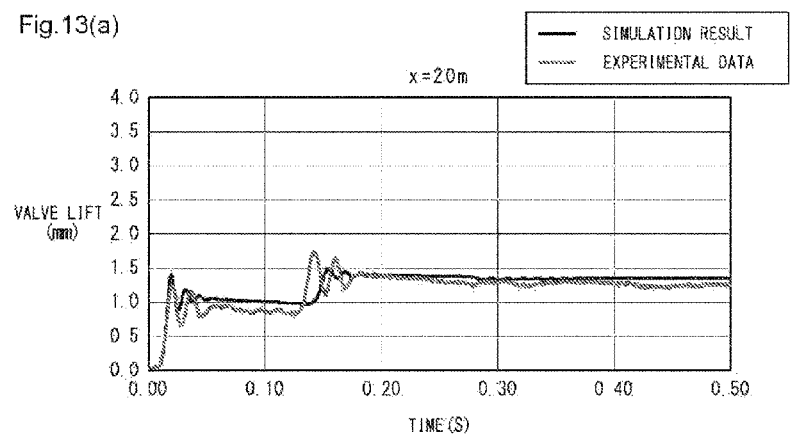
FIG. 13a is a graph showing experimental data and a simulation result for valve lift plotted against time in the case where the length of the upstream pipe X is 20 m.
Figure 13B:
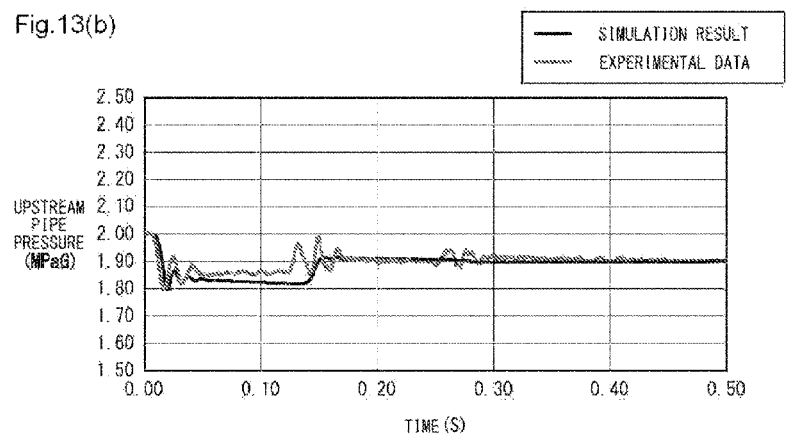
FIG. 13(b) is a graph showing experimental data and a simulation result for upstream pipe pressure plotted against time in the case where the length of the upstream pipe X is 20 m.
Figure 13C:
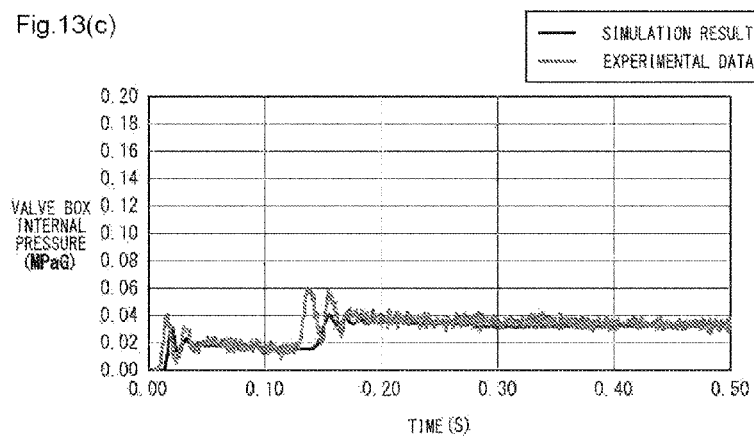
FIG. 13(c) is a graph showing experimental data and a simulation result for valve box internal pressure plotted against time in the case where the length of the upstream pipe X is 20 m.

FIGS. 9-13 show the experimental data and the simulation results when the length x of the upstream pipe is varied. FIG. 9 shows the experimental data and the simulation result in the case where the length of the upstream pipe is 0 m. FIG. 10 shows the experimental data and the simulation result in the case where the length of the upstream pipe is 1 m. FIG. 11 shows the experimental data and the simulation result in the case where the length of the upstream pipe is 5 m. FIG. 12 shows the experimental data and the simulation result in the case where the length of the upstream pipe is 10 m. FIG. 13 shows the experimental data and the simulation result in the case where the length x of the upstream pipe is 20 m. (a) represents the time variation of the valve lift Z, (b) represents the time variation of the upstream pipe pressure $P_V$, and (c) represents the time variation of the valve box internal pressure $P_B$, respectively.

From the experimental data, it is found that: when the length x of the upstream pipe is 0 m, the valve disc hardly vibrates as shown in FIG. 9, and the upstream pipe pressure $P_V$ and the valve box internal pressure $P_B$ are stable; when the length of the upstream pipe is 1 m and 5 m, as shown in FIGS. 11-12, the valve lift Z, the upstream pipe pressure Pv, and the valve box internal pressure $P_B$ vary periodically with large amplitude, as shown in FIGS. 11 and 12; and however, with the length x of the upstream pipe becoming long to 10 m and 20 m, the valve lift Z, the upstream pipe pressure $P_V$, and the valve box internal pressure $P_B$ vary small.

On the other hand, in the simulation result, the timing at which a vibration occurs is almost same as that of the experiment whereas the amplitude of the simulation differs slightly from the experiment. In FIG. 12 (*a*), the experimental data shows that the valve disc vibrates at the time of 0.02 s then attenuates, and vibrates again at the time of 0.09 s after the attenuation. The interval between the vibrations of 0.07 s is almost the same time during which a pressure wave, which is generated by the safety valve opening, reciprocates along the 10 m long pipe, allowing the occurrence of vibration relating to the pressure wave propagation to be correctly simulated. The reason why the occurrence of vibration can be simulated so correctly is: the equation of motion of the valve disc is established by applying the valve lifting force function f (Z) and the flow coefficient ratio $y/y_C$; and the mutual influence between the safety valve and the pipe is taken into consideration by adopting the mass conservation law and the equation of motion of the pipe.

Figure 15A:
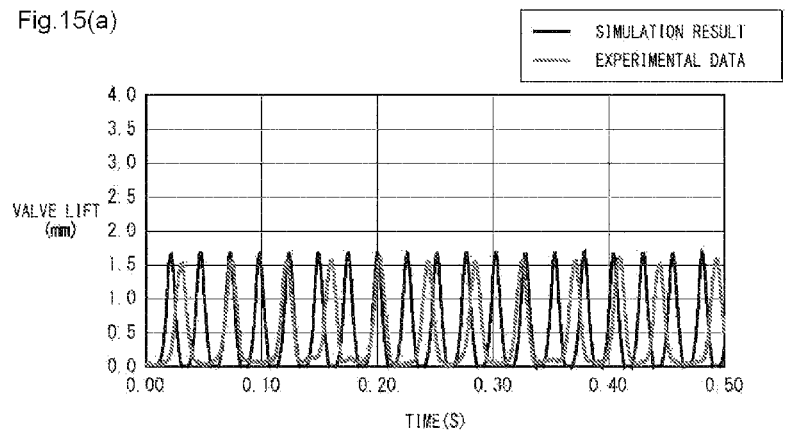
FIG. 15(a) is a graph showing experimental data and a simulation result for valve lift plotted against time in the case where the area of the safety valve outlet AD is 6.0 $cm^2$.
Figure 15B:
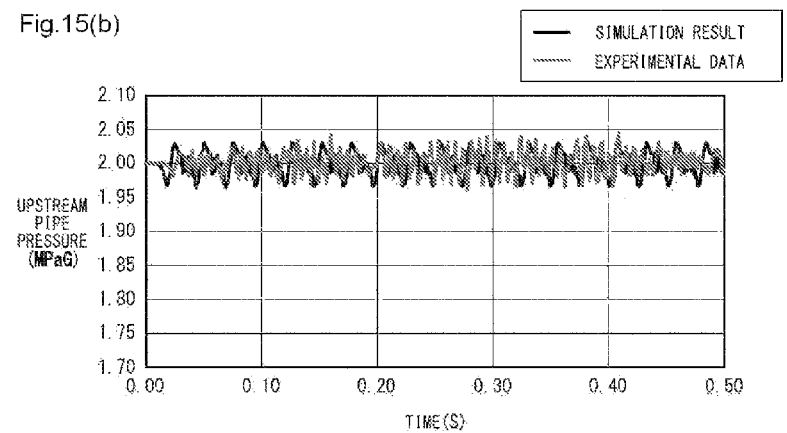
FIG. 15(b) is a graph showing experimental data and a simulation result for upstream pipe pressure plotted against time in the case where the area of the safety valve outlet AD is 6.0 $cm^2$.
Figure 15C:
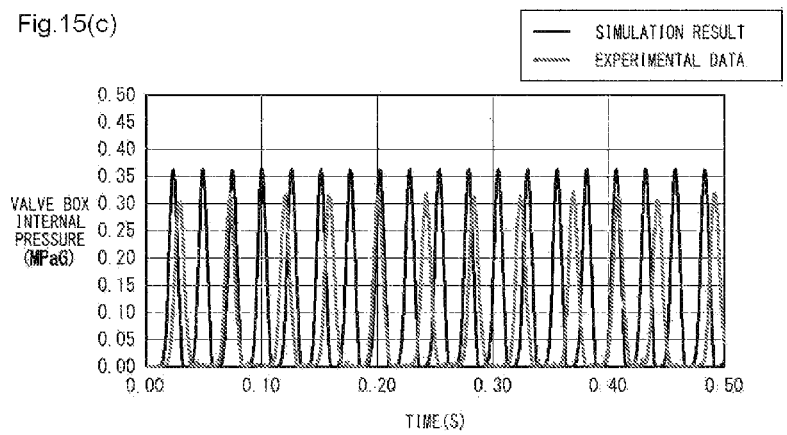
FIG. 15(c) is a graph showing experimental data and a simulation result for valve box internal pressure plotted against time in the case where the area of the safety valve outlet AD is 6.0 $cm^2$.

FIGS. 14 and 15 show the experimental data and the simulation results when the safety valve outlet area $A_D$ is varied. FIG. 14 shows the experimental data and the simulation result in the case where the safety valve outlet area $A_D$ is 10.0 cm². FIG. 15 shows the experimental data and the simulation result in the case where the safety valve outlet area $A_D$ is 6.0 cm². (a) represents the time variation of the valve lift Z, (b) represents the time variation of the upstream pipe pressure $P_V$, and (c) represents the time variation of the valve box internal pressure $P_B$, respectively.

It is found from the experimental data that, when the safety valve outlet area $A_D$ is large, 10.0 cm², a vibration hardly occurs as shown in FIG. 4, whereas when the safety valve outlet area $A_D$ becomes small, 6 cm², a vibration occurs. The simulation in which the safety valve vibration analyzer 100 is adopted, can obtain the result almost the same as the experimental data. In accordance with the safety valve vibration analyzer 100 according to the present embodiment, a simulation in which the influence of the safety valve outlet area is taken into consideration, can be conducted.

As shown in FIGS. 9-15, in accordance with the safety valve vibration analyzer 100 according to the present embodiment, vibration analysis of a safety valve in which the influences of the length of the upstream pipe and the safety valve outlet area are taken into consideration, can be conducted correctly. A preferable pipe system can be designed by using the safety valve vibration analyzer 100, in which vibration of a safety valve can be minimized, for example, by varying the length of an upstream pipe with the position where the safety valve is placed being adjusted, even in a pipe system having the same length.

The present invention has been described above based on an embodiment. These embodiments are intended solely for the purpose of illustration, and it should be understood by those skilled in the art that various modifications are possible in combining those various components and various processing and those modifications also fall in the scope of the present invention.

For example, in the above embodiment, a physical model is structured such that a pressure vessel with large capacity is connected to the upstream side pipe inlet 13 and a header with a large diameter is connected to the downstream side pipe outlet 15; however, another different physical model can be structured such that other pipes, such as a main pipe and a header pipe, is connected to the upstream side pipe inlet 13 and the downstream side pipe outlet 15.

The invention claimed is:

1. A safety valve vibration analyzer that analyzes vibration of a valve disc in a safety valve, the safety valve analyzer comprising:
   an input unit in which set conditions of a physical model including the safety valve and an upstream pipe connected to the safety valve is inputted;
   a first holder that holds a safety valve governing equations including an equation of motion of the valve disc, a flow equation at the safety valve inlet, a flow equation at the safety valve outlet, and a mass conservation equation in a valve box;
   a second holder that holds a pipe governing equations including a mass conservation equation, an energy equation, and an equation of motion of a fluid flowing the upstream pipe;
   a third holder that holds a valve lifting force function representing the relation between the valve lift and a valve lifting force exerting on the valve disc; and
   a computer processing unit coupled to said input unit and said holders wherein said computer processing unit derives a time variation of a valve lift by using the set conditions inputted in the input unit, using the safety valve governing equations, including the equation of motion of the valve disc to which the valve lifting force function read from the third holder is applied, the flow equation at the safety valve inlet, the flow equation at the safety valve outlet and the mass conservation equation in a valve box, and using the pipe governing equations held in the second holder.

2. The safety valve vibration analyzer according to claim 1, wherein the valve lifting force function is created by measuring the relation between the valve lift and the valve lifting force.

3. The safety valve vibration analyzer according to claim 1, wherein the computer processing unit derives the time variation of the valve lift using the equation of motion of the valve disc comprising a ratio of an orifice flow coefficient to an orifice critical flow coefficient of the safety valve.

4. The safety valve vibration analyzer according to claim 1, wherein the equation of motion of the valve disc is represented by Equation 1:

$$M_S\ddot{Z}+C_S\dot{Z}+KZ=(P_V-P_B)A_H\{1+f(Z)(\psi/\psi_C)^2\}-KZ_S$$

wherein $M_S$ represents a mass of a moving part including the valve disc; $C_S$ represents a damping coefficient; K represents a spring constant; Z represents the valve lift; $P_V$ represents a safety valve inlet pressure; $P_B$ represents a valve box internal pressure; $A_H$ represents a valve disc holder area; f(Z) represents the valve lifting force function; y represents an orifice flow coefficient; $y_C$ represents an orifice critical flow coefficient; Zs represents an initial deformation amount of the spring; and t represents time.

5. The safety valve vibration analyzer according to claim 1, further comprising:
   an evaluation unit that determines the set conditions inputted in the input unit are good or not in response to an operation result provided by the computer processing unit.

* * * * *

UNITED STATES PATENT AND TRADEMARK OFFICE
CERTIFICATE OF CORRECTION

PATENT NO.        : 8,682,601 B2
APPLICATION NO.   : 12/667497
DATED             : March 25, 2014
INVENTOR(S)       : Hisao Izuchi It is certified that error appears in the above-identified patent and that said Letters Patent is hereby corrected as shown below:

Title Page

Item (12) Delete "Hisao" and replace with -- Izuchi --.

Item (75) Please correct name of the inventor from: Izuchi Hisao to Hisao IZUCHI.

Signed and Sealed this
Twelfth Day of July, 2016

Michelle K. Lee
*Director of the United States Patent and Trademark Office*